United States Patent

Okada et al.

[11] Patent Number: 5,819,537
[45] Date of Patent: Oct. 13, 1998

[54] AXLE DRIVING APPARATUS

[75] Inventors: Hideaki Okada; Hiroaki Shimizu, both of Amagasaki, Japan

[73] Assignee: Kanzaki Kokyukoki Mfg. Co., Ltd., Japan

[21] Appl. No.: 757,630

[22] Filed: Dec. 2, 1996

[51] Int. Cl.[6] .................................................. F16D 39/00
[52] U.S. Cl. .............................. 60/487; 92/12.2; 74/531
[58] Field of Search .............................. 92/12.2; 60/487; 74/475, 531

[56] References Cited

U.S. PATENT DOCUMENTS

| | | | |
|---|---|---|---|
| 3,354,981 | 11/1967 | Swanson et al. | 74/471 R |
| 3,837,235 | 9/1974 | Peterson | 74/531 |
| 3,907,058 | 9/1975 | Gunderman . | |
| 4,018,104 | 4/1977 | Bland et al. | 74/531 |
| 4,543,851 | 10/1985 | Gilbert | 74/531 |
| 4,608,879 | 9/1986 | Ishida et al. . | |
| 5,239,827 | 8/1993 | Havens | 60/487 |
| 5,335,496 | 8/1994 | Azuma et al. | 60/487 |

*Primary Examiner*—F. Daniel Lopez
*Attorney, Agent, or Firm*—Sterne, Kessler, Goldstein & Fox P.L.L.C.

[57] ABSTRACT

A hydrostatic transmission is housed in a housing so as to drive axles of a moving vehicle. A speed adjusting means for changing the angle of slant of a movable swash plate of a hydraulic pump portion of a hydrostatic transmission is provided and is held in an optional position by friction members and biasing means disposed inside or outside of the housing.

21 Claims, 10 Drawing Sheets

AXLE DRIVING APPARATUS

FIELD OF THE INVENTION

The present invention relates to an axle driving apparatus, and more particularly to an axle driving apparatus provided integrally in a housing with a hydrostatic transmission (hereinafter referred to as "HST"), axles, and a power transmitting mechanism. A speed adjusting means for changing the angle of a movable swash plate of the HST is also provided. The speed adjusting means can be held in an optional rotational position when rotated to change the speed of the axles.

BACKGROUND OF THE INVENTION

A conventional axle driving apparatus comprises a housing in which an HST, axles and a power transmitting mechanism for interconnecting the HST and axles are housed. The HST comprises a variable displacement hydraulic pump and a fixed displacement hydraulic motor. The hydraulic pump includes a plurality of pistons in a cylinder block. The heads of the pistons abut against a movable swash plate to change an angle thereof, thereby changing the capacity of the pump, the number of rotations of the hydraulic motor and the speed of the axle. Means for changing the angle of the movable swash plate includes an arm fixed to a trunnion provided along a rotary axis of the movable swash plate, or a control arm which abuts against one end of the swash plate. In either arrangement, a speed change lever or a speed change pedal provided on the vehicle is connected with the arm through a wire or a link and is operated to change the speed of the vehicle.

It is common to construct a frictional speed-holding mechanism surrounding a speed change member, such as a lever, provided on the vehicle, so that the HST is restrained to provide a predetermined speed for the vehicle to travel. Such a construction is disclosed in, for example, U.S. Pat. Nos. 3,907,058 and 4,608,879.

However, the frictional speed-holding mechanism constructed as mentioned above, when provided by a link mechanism connecting the arm and the speed change member, must have sufficient space on the vehicle for disposing the mechanism. This restricts the vehicle design, causing it to be inconvenient and troublesome to assemble.

SUMMARY OF THE INVENTION

The axle driving apparatus of the present invention is designed so that axles and an HST are housed in a common housing. Power is transmitted from a prime mover to input means of the HST. An angle of a movable swash plate of the hydraulic pump portion of the HST is changed so as to change the rotation direction and the number of rotations of an output shaft of the hydraulic pump. This causes the transmission of power from the output shaft to the axles. The speed adjusting means for changing the angle of the movable swash plate has an arm portion disposed outside of the housing. Holding means for restraining the speed adjusting means in an optional position is provided as a part of the arm portion or as a rotary shaft portion thereof. The holding means comprise a first friction member provided on the arm portion or the rotary shaft, a second friction member provided on the housing and a biasing member for bringing both friction members into contact with each other.

Thus, even when the arm is rotated and looses its operating force, the frictional holding means can hold the position of the arm. The first friction member, second friction member, and biasing member are compactly disposed on the rotary shaft portion. The frictional speed holding mechanism is small in size and is integral with the axle driving apparatus, thereby being advantageous.

These and other objects of the invention will become more apparent from the detailed description and examples which follow.

DETAILED DESCRIPTION OF THE PREFERRED EMBODIMENTS

Figure 1:
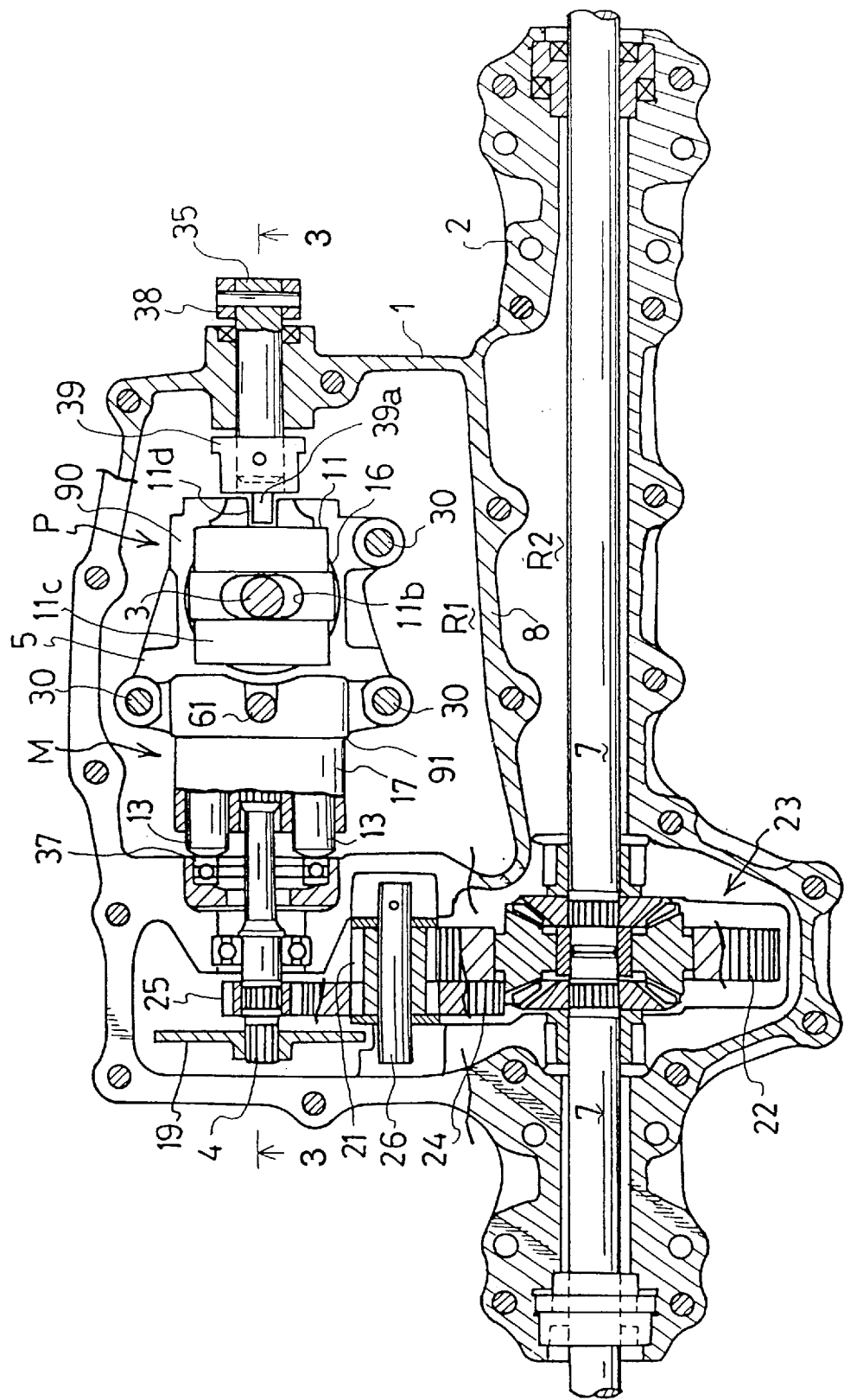
FIG. 1 is a partially sectional plan view of the axle driving apparatus of the present invention, from which an upper half housing has been removed.

First an explanation will be given on the entire construction of the axle driving apparatus of the present invention in accordance with FIGS. 1, 2, 3 and 4. A housing of the axle driving apparatus is comprised of an upper half housing 1 and a lower half housing 2 which are joined to each other along a horizontally flat peripheral surfaces. A bearing for a motor shaft 4 is provided along these horizontally flat peripheral surfaces. Bearings for axles 7 are shifted upwardly from the joint surface of upper half housing 1 and lower half housing 2 and are disposed in upper half housing 1 to rotatably support axles 7. Axles 7 are differentially coupled by a differential gear unit 23 and project at both ends, leftwardly and rightwardly of the housing, respectively.

The interior of the housing is divided by an intermediate wall 8 into a first chamber R1 in which the HST is housed and a second chamber R2 in which a drive train of gears for transmitting power from motor shaft 4 to differential gear unit 23 and axles 7 is housed. First and Second chambers R1 and R2 are filled with common lubricating oil to form an oil sump. An oil bore (not shown) and an oil filter covering the oil bore are disposed in an optional position on intermediate wall 8 so that oil can freely flow between both chambers R1 and R2.

First chamber R1 houses the HST comprised of a hydraulic pump P, a hydraulic motor M and a center section 5. Center section 5 is substantially L-like-shaped, having a horizontal surface 90 and a vertical surface 91. Center section 5 is fixed to upper half housing 1 through bolts 30. Hydraulic pump P is disposed on horizontal surface 90 of center section 5. Hydraulic motor M is disposed on vertical surface 91. On horizontal surface 90 of center section 5 is formed a pump mounting surface on which a cylinder block 16 is rotatably and slidably disposed. A plurality of pistons 12 are fitted into a plurality of cylinder bores through biasing springs and are relatively movable in reciprocation within the bores. A thrust bearing 1a, held to a movable swash plate 11, abuts against the heads of pistons 12. At the center of movable swash plate 11 is provided an opening 11b through which a pump shaft 3 can perforate. Pump shaft 3 is used also as an input shaft and is vertically disposed and not-relative-rotatably retained along the rotary axis of cylinder block 16 to thereby constitute hydraulic pump P. An input pulley 43 is fixed to the upper end of pump shaft 3 which upwardly and outwardly projects from the upper wall of upper half housing 1. Power from a prime mover (not shown) provided on the vehicle is inputted into hydraulic pump P through a belt transmitting mechanism (not shown).

At vertical surface 91 of center section 5 is formed a hydraulic motor mounting surface on which a cylinder block 17 is rotatably slidably disposed. A plurality of pistons 13 are fitted into a plurality of cylinder bores in cylinder block 17 through biasing springs and are relatively movable in reciprocation therein. The heads of pistons 13 abut against a fixed swash plate 37. Fixed swash plate 37 is fixedly sandwiched between upper half housing 1 and lower half housing 2. Motor shaft 4 is horizontally disposed to be not-relative-rotatably retained along the rotary axis of cylinder block 17 so as to constitute hydraulic motor M. Motor shaft 4 is rotatably supported by the housing through a bearing bore provided in vertical surface 91 of center section 5 and through a sealed bearing held along the joint surface of upper half housing 1 and lower half housing 2.

A transmission for transmitting power from motor shaft 4 to differential gear unit 23, as shown in FIG. 1, is constructed so that a gear 25 is provided on a portion of motor shaft 4 in second chamber R2 and engages with a larger diameter gear 24 on a counter shaft 26. A smaller diameter gear 21, engageable with a ring gear 22 of differential gear unit 23, and larger in width than larger diameter gear 24 is also disposed on counter shaft 26 so that gears 21 and 24 rotate together. Differential gear unit 23 is driven by ring gear 22 so as to transmit power to left and right axles 7 through differential gear unit 23. A brake disc 19 is fixed onto the axial end of motor shaft 4 in second chamber R2. Brake disc 19 can be braked by operating a conventional brake arm (not shown).

Feed and discharge oil is introduced from cylinder blocks 16 and 17 into a pair of arcuate ports formed on pump mounting surface 90 of center section 5 and a pair of arcuate ports formed on motor mounting surface 91 of center section 5, respectively. The pair of arcuate ports on pump mounting surface 90 and those on motor mounting surface 91 communicate with each other through a pair of oil passages provided in center section 5 forming a closed fluid circuit which circulates operating oil between hydraulic pump P and hydraulic motor M.

Figure 3:
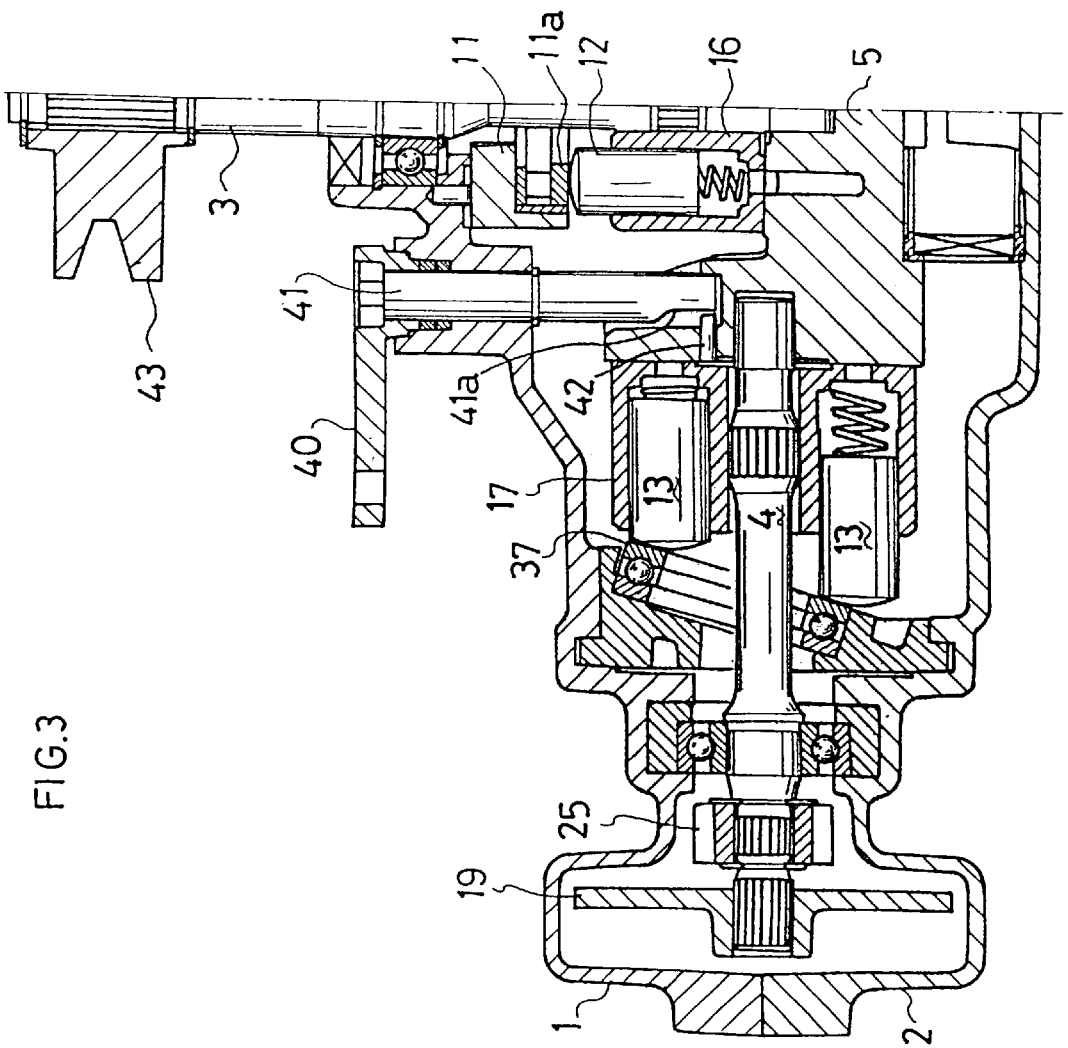
FIG. 3 is a sectional left-side view looking in the direction of the arrows 3—3 in FIG. 1.

A by-pass operating lever 40, as shown in FIG. 3, is disposed above upper half housing 1 and is fixed at the base to the upper end of a by-pass lever shaft 41 which is vertically, pivotally supported to an upper wall of upper half housing 1. The lower end of by-pass lever shaft 41 extends along a side surface of center section 5 opposite to motor mounting surface 91. A flat surface 41a is formed along a part of the outer periphery of the lower end of by-pass lever shaft 41.

A through bore is open in center section 5 at a position slightly above the center of motor mounting surface 91. A push pin 42 is slidably supported in the through bore in the direction of the rotary axis of cylinder block 17. Push pin 42 can abut at one end thereof against the rear surface of cylinder block 17 which is in close contact with motor mounting surface 91 of center section 5. The other end of push pin 42 abuts against flat surface 41a of by-pass lever shaft 41.

When an operator desires to haul the vehicle, he rotates by-pass operating lever 40, causing by-pass lever shaft 41 to rotate which pushes flat surface 41a of the lower end of lever shaft 41 against push pin 42 which moves axially toward cylinder block 17 so as to release cylinder block 17 from contact with motor mounting surface 91 of center section 5. As a result, the pair of oil passages bored in center section 5 and the oil sump in the housing communicate with each other causing motor shaft 4 to freely rotate. This enables axles 7 to be idle when the vehicle is hauled.

The piston abutting surface of movable swash plate 11 of hydraulic pump P is slantingly operated with respect to the rotary axis of cylinder block 16, so that the amount and the direction of oil discharged from hydraulic pump P can be changed. On the rear or upper surface of movable swash plate 11 is formed a convex portion 11c which is in the form of a circular arc. Along the inner surface of the upper wall of upper half housing 1 is formed a concave portion also in the form of a circular arc which meets with convex portion 11c. Movable swash plate 11, when slanted, slides longitudinally along the concave portion of upper half housing 1. The axis of slanting movement of movable swash plate 11 is positioned on the center of curvature of convex portion 11c in a circular arc and extends in parallel to motor shaft 4 and to axles 7.

In order to slantingly move movable swash plate 11, a control shaft 35 is rotatably supported in a side wall of upper half housing 1. The longitudinal axis of control shaft 35 is parallel to the axis of slanting movement of movable swash plate 11. At one axial end of control shaft 35 in the housing is fixed a swinging arm 39. From the upper end of swinging arm 39 projects an engaging portion 39a engageable with a groove 11d provided on a side surface of movable swash plate 11. A pair of engaging members project therefrom and are longitudinally spaced at a predetermined interval to form groove 11d therebetween.

Figure 2:
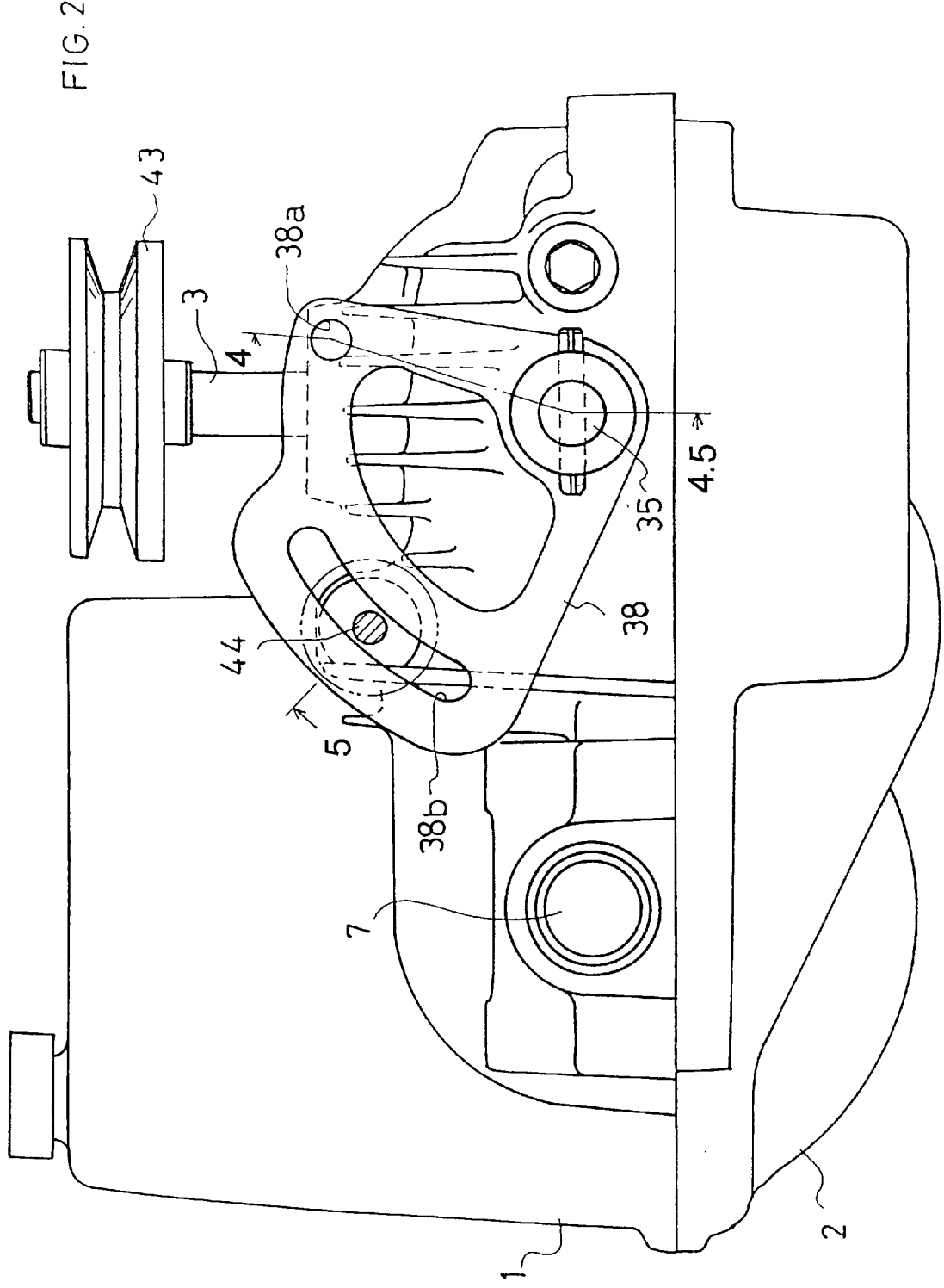
FIG. 2 is a side view of a first embodiment of a frictional speed holding mechanism of the present invention.
Figure 4:
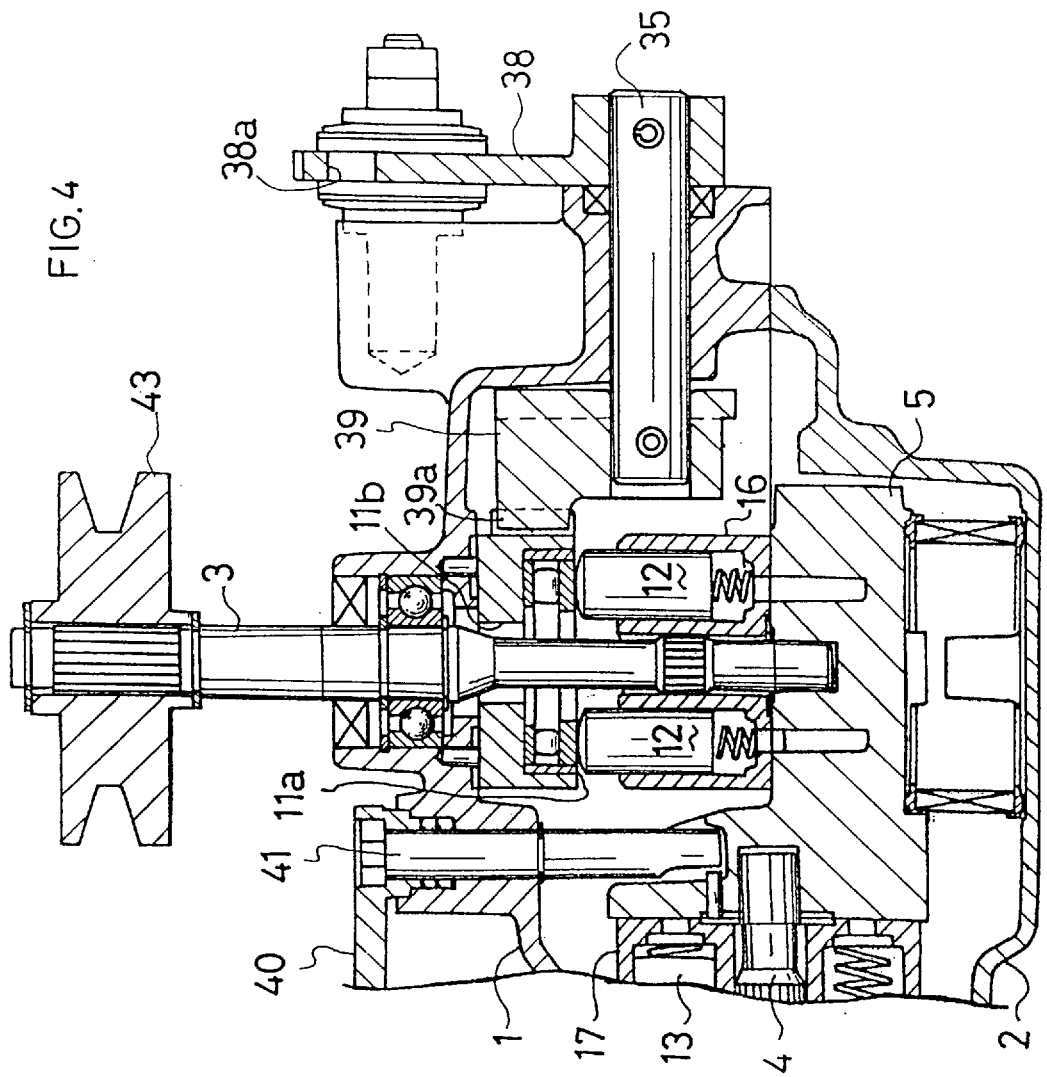
FIG. 4 is a sectional right-side view looking in the direction of the arrows 4—4 in FIG. 2.

A control arm 38, as shown in FIGS. 1, 2 and 4 is fixed onto an outer end of control shaft 35 projecting from the side wall of upper half housing 1 so as to enable movable swash plate 11 to be operated from the exterior of the housing. Control arm 38 is connected with respect to a speed changing member (not shown), such as a lever or a pedal provided on the vehicle through a control rod (not shown) which is capable of being longitudinally pushed or pulled.

The present invention is designed so that holding means is provided in the vicinity of control arm 38 so as to restrain the angle of slant of movable swash plate 11 in an optional position. A first embodiment of the holding means will now be described in accordance with FIGS. 2, 4 and 5. Control arm 38 is triangular or fan-like-shaped. One end of control shaft 35 is fixed at the vertex of control arm 38. A pivotal support bore 38a, through which arm 38 is connected with a control rod, which is connected to the speed changing member, is open at one side of the circular arc shaped portion of control arm 38. A circular arc shaped bore 38b is open at the other side of the circular arc shaped portion of control arm 38. A holding means for regulating the range of rotation of control arm 38 and for holding the rotation position thereof, is provided in circular arc shaped bore 38b.

Figure 5:
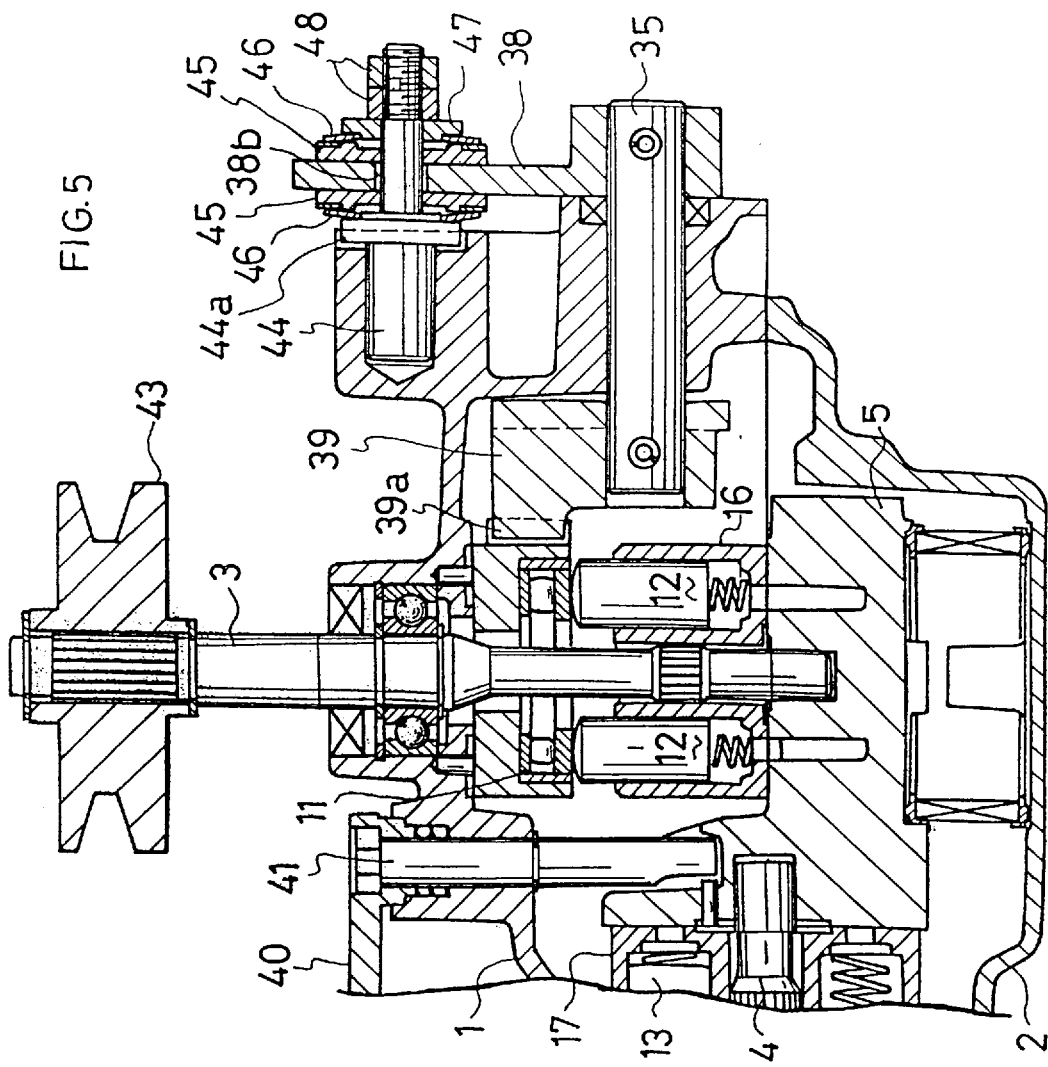
FIG. 5 is a sectional view looking in the direction of the arrows 5—5 in FIG. 2.

The holding means, as shown in FIG. 5, comprises both sides of control arm 38 used as a first friction member, a support shaft 44, fixed friction plates 45 used as second friction members, disc-like springs 46 used as biasing members, and a holding plate 47. Support shaft 44 is provided in a sidewall of upper half housing 1 and is disposed in parallel to control shaft 35. A flange 44a is formed at an intermediate portion of support shaft 44. The inner axial end of support shaft 44 is inserted into circular arc shaped bore 38b of control arm 38. Two fixed friction plates 45 are fitted onto support shaft 44, one at each side surface of control arm 38, sandwiching control arm 38 between plates 45. Two springs 46 are also fitted onto support shaft 44, one along the outside of each friction plate 45. A holding plate 47 is fixed onto the utmost end of support shaft 44 against one spring 46. Nuts 48 are fixedly screwed onto the utmost end of support shaft 44 against plate 47. The amount to which each nut 48 is tightened changes the distance between flange 44a and holding plate 47 so as to enable the pressing force of each friction plate 45 with respect to control arm 38 to be adjusted, whereby the holding force with respect to both side surfaces of control arm 38 can also be adjusted. Thus, friction plates 45 are permanently pressed onto both side surfaces of control arm 38 by springs 46, so that even when an operating force is no longer asserted onto control arm 38 after it has been rotated for changing the speed, control arm 38 is held in position.

Figure 6:
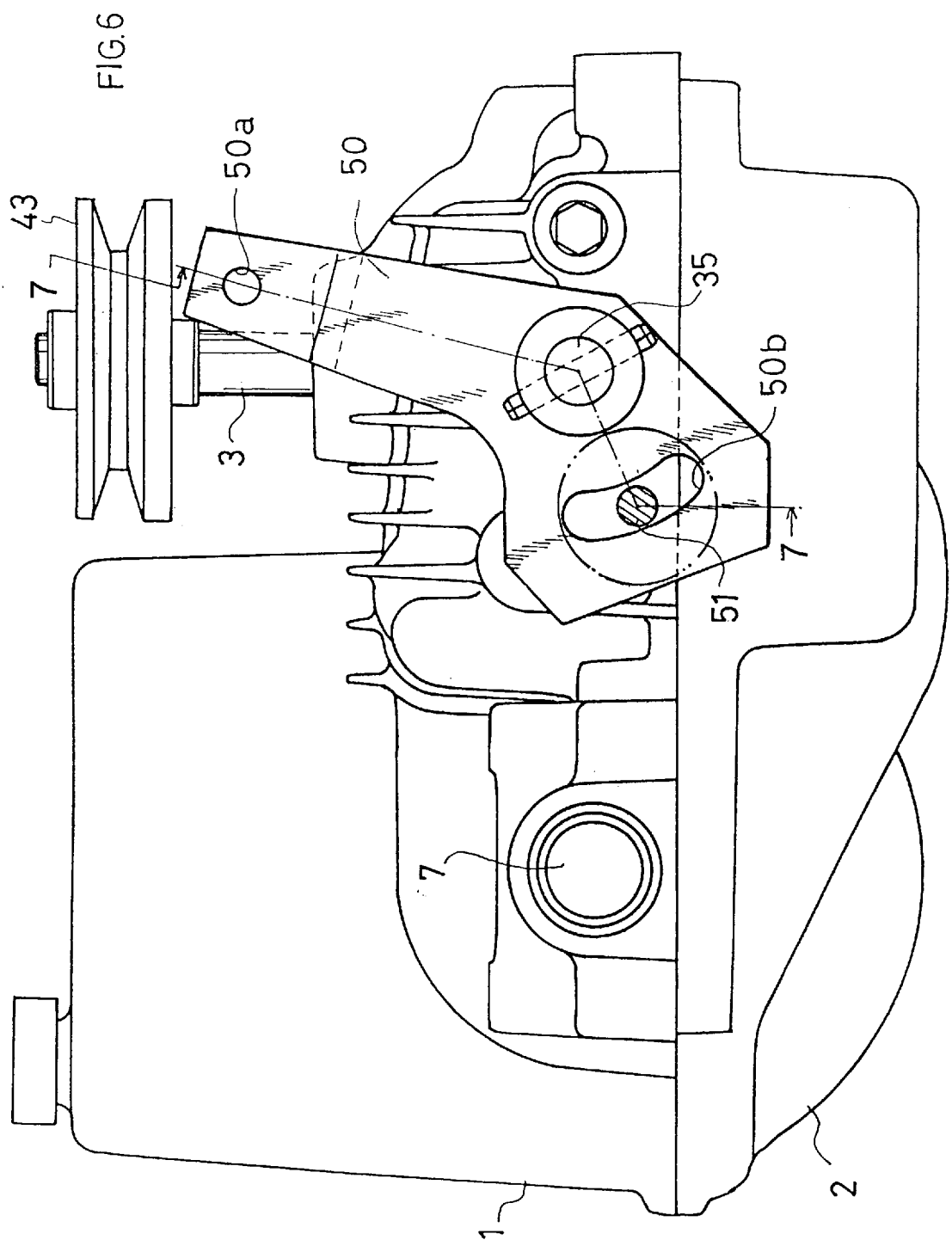
FIG. 6 is a side view of a second embodiment of the frictional speed holding mechanism of the present invention.
Figure 7:
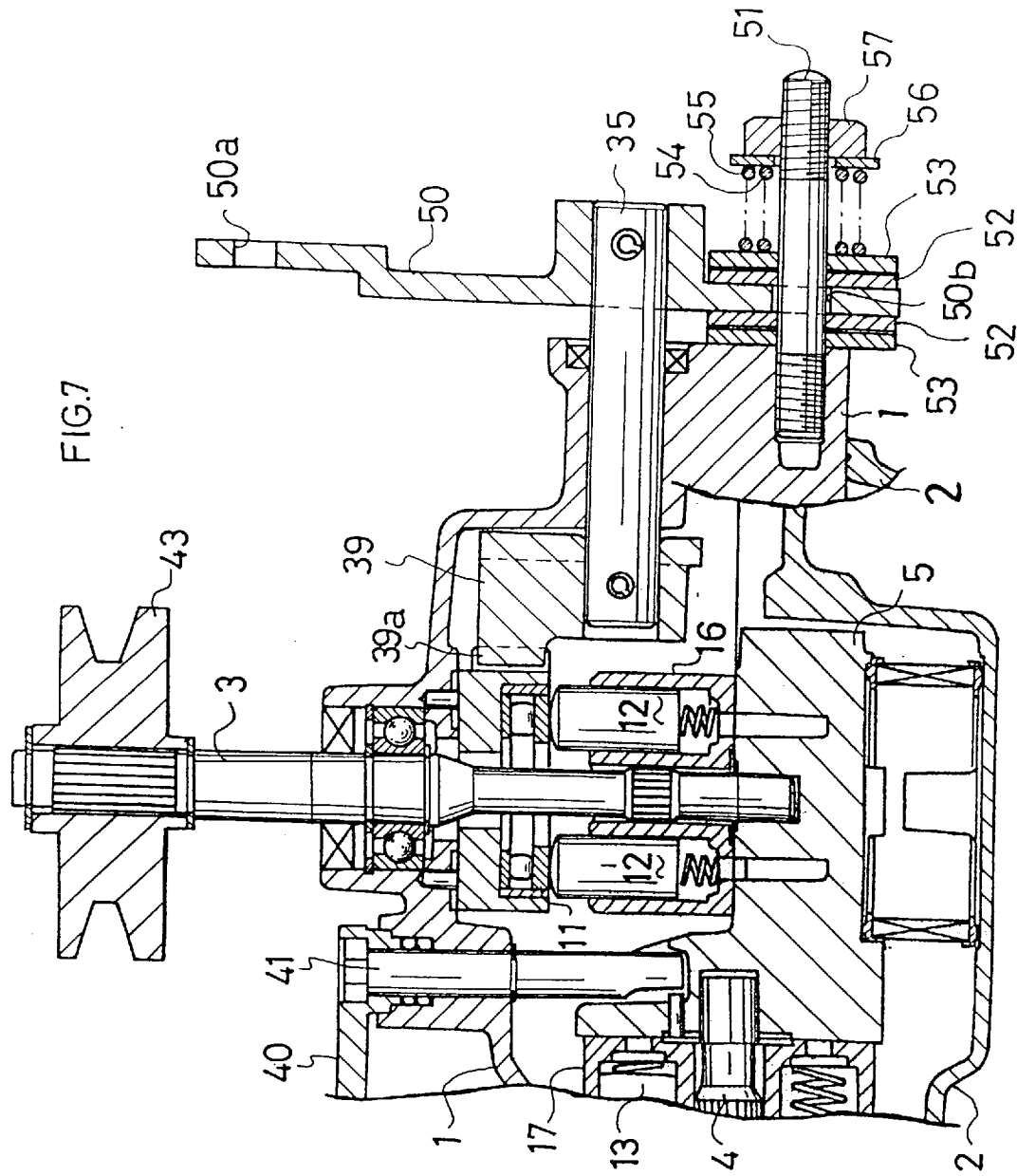
FIG. 7 is a sectional view looking in the direction of the arrows 7—7 in FIG. 6.

Next, explanation will be given on a second embodiment of a holding means of the present invention in accordance with FIGS. 6 and 7, in which a control arm 50 is fixed at the central portion thereof onto an outer end of control shaft 35 projecting from a sidewall of upper half housing 1. A pivotal bore 50a is open at one end of control arm 50 for connecting a control rod (not shown) is the same as mentioned above. A circular arc shaped bore 50b near control shaft 35 is open at the other end of control arm 50. Bore 50b regulates the range of rotation of control arm 50. A support shaft 51 perforates through bore 50b and is fixed to the sidewall of upper half housing 1 by being screwed into upper half housing 1. Support shaft 51 perforates through bore 50b. Fixed friction plates 52 and 53 are axially slidably fitted onto support shaft 51 at each side surface of arm 50, sandwiching arm 50 therebetween. Double coil springs 54 and 55, or biasing members and a holding plate 56 for holding springs 54 and 55 are fitted onto the utmost end of support shaft 51. A nut 57 screws onto the utmost end of support shaft 51. Thus, the frictional force of each friction plate 52 and 53 with respect to arm 50 is adjustable according to the amount by which nut 57 is screwed onto shaft 51. As a result, control arm 50, as was control arm 38 in the first described embodiment, is held in position after it is rotated. The remaining details of this embodiment are the same as in the first described embodiment.

Figure 8:
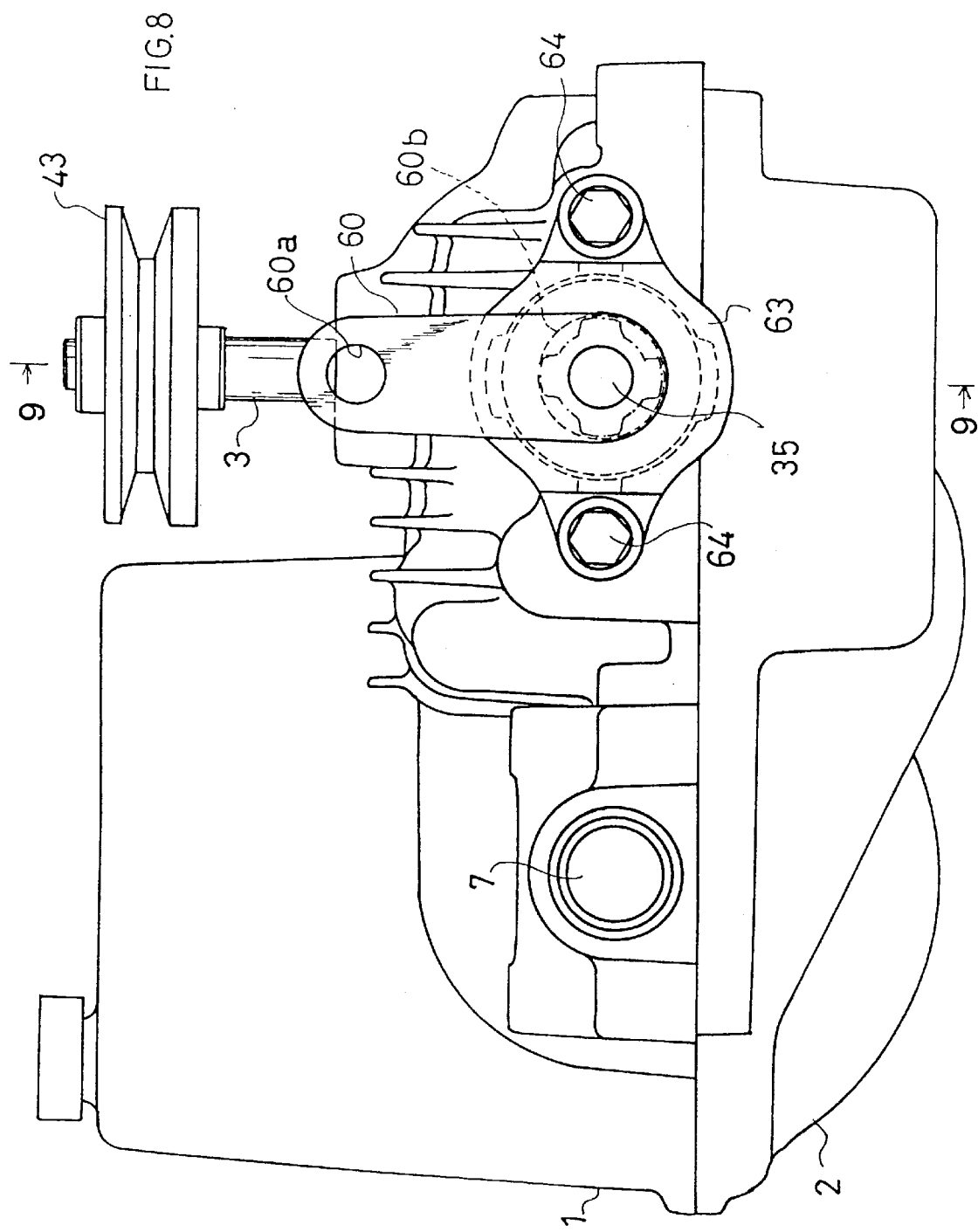
FIG. 8 is a side view of a third embodiment of the frictional speed holding mechanism of the present invention.
Figure 9:
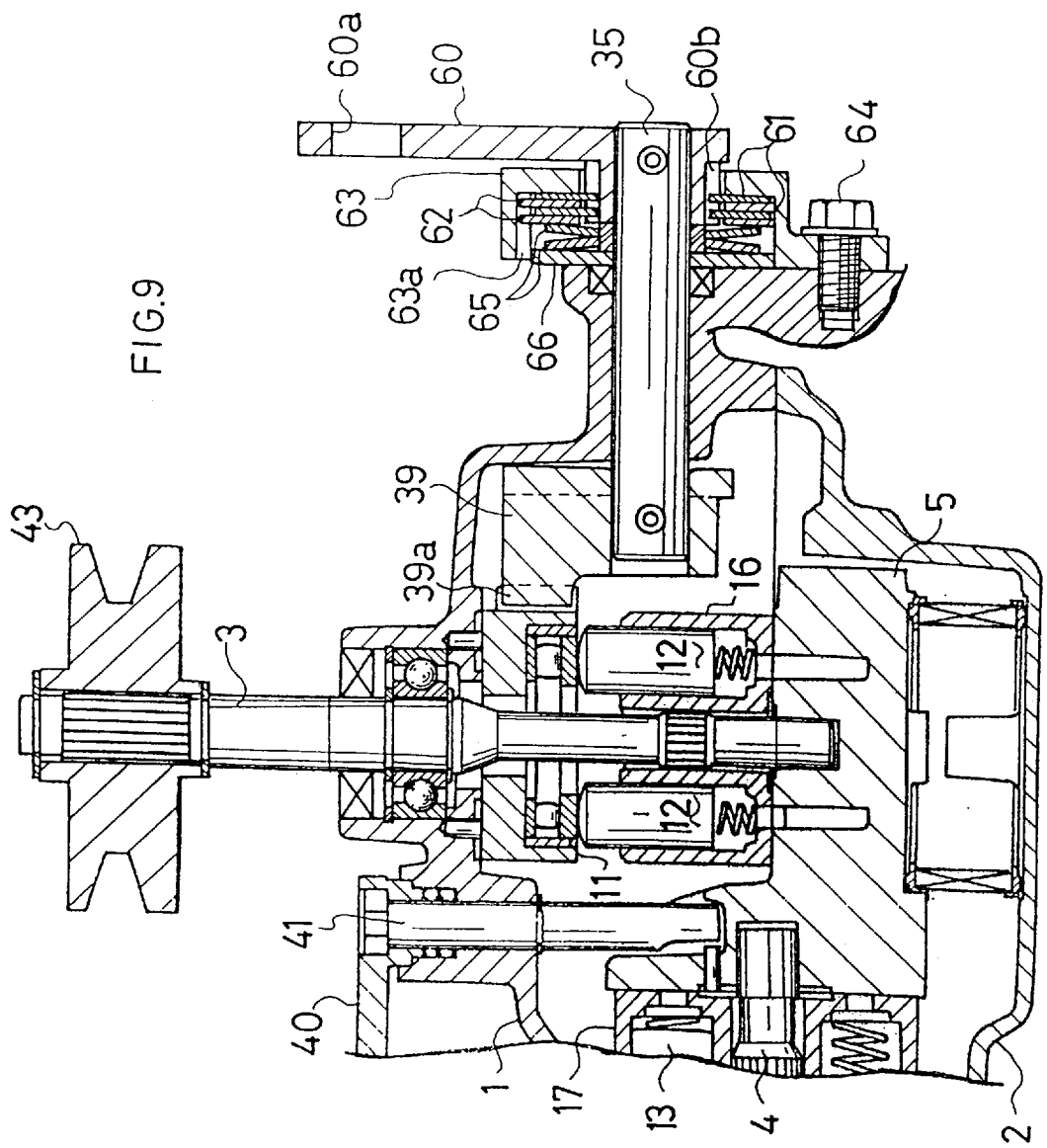
FIG. 9 is a sectional view looking in the direction of the arrows 9—9 in FIG. 8.

Next, explanation will be given on an a third embodiment of the holding means of the present invention in accordance with FIGS. 8 and 9, in which a control arm 60 is fixed at the base thereof to an outer end of control shaft 35 projecting from the sidewall of upper half housing 1. A pivotal support bore 60a for connecting with a control rod, as in the above-mentioned embodiments is open at the utmost end of control arm 60. A cylindrical cover member 63, surrounding the outer periphery of control shaft 35, is fixed by bolts 64 to the sidewall of upper half housing 1. A boss which is received by cover member 63 is integrally formed with the surface of the base of control arm 60 at a side of the housing. Engaging grooves 60b, extending axially along the boss, are longitudinally formed on the outer periphery thereof. Movable side friction plates 61, or first friction members, are fitted into engaging grooves 60b. On the inner peripheral surface of cover member 63 are formed engaging grooves 63a into which fixed side friction plates 62, or second friction members, are fitted so as to be disposed alternately with movable side friction plates 61. Dish-like shaped springs 65, or biasing members, are disposed between plates 62 and a holding plate 66 which is supportably fitted and disposed against the side surface of upper half housing 1. Springs 65 bring friction plates 61 and 62 into press-contact with each other to retain the position of arm 60. The remainder of this embodiment is similar to the other embodiments described above.

Figure 10:
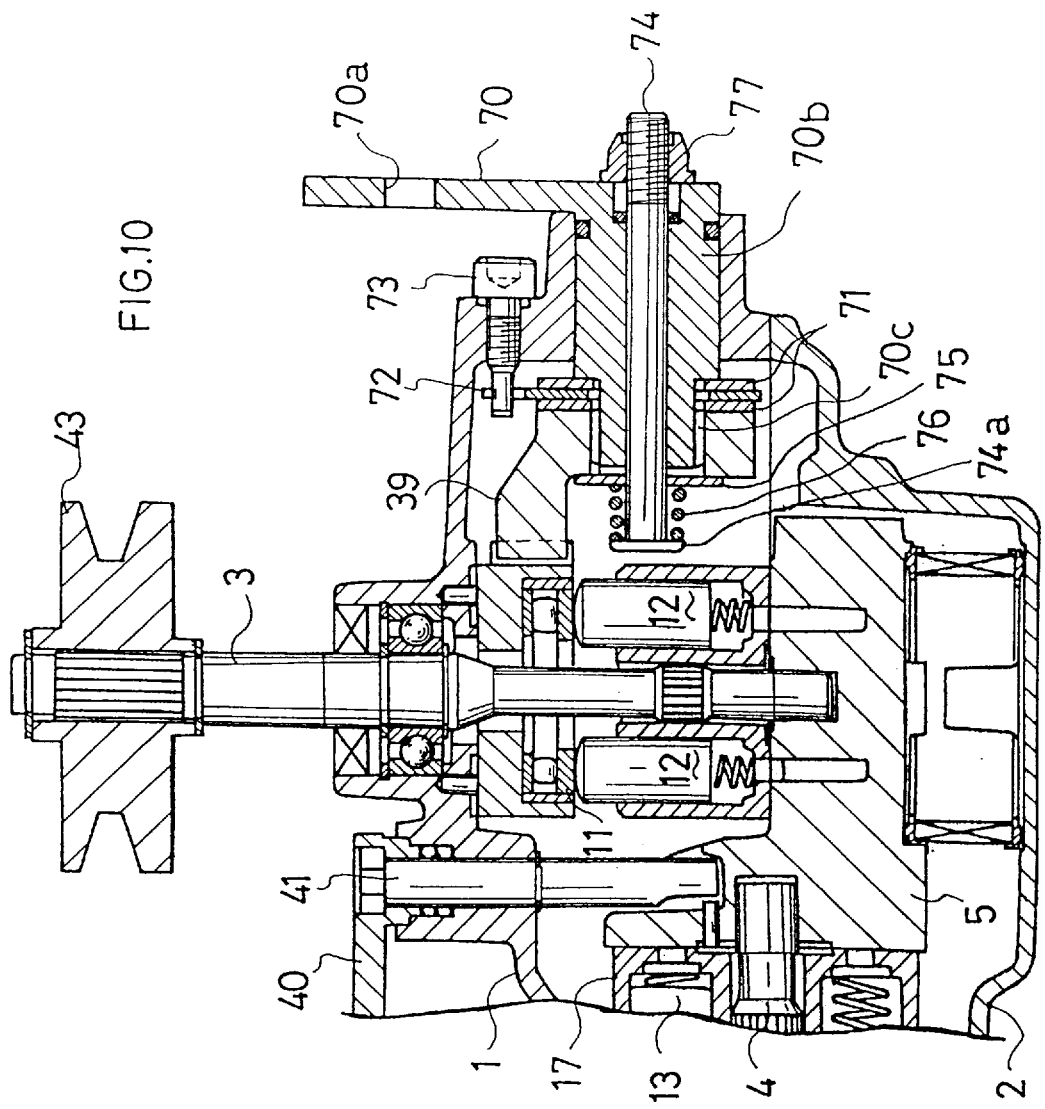
FIG. 10 is a sectional front view of a fourth embodiment of the frictional speed holding mechanism of the present invention.

A fourth embodiment of the holding means of the present invention is shown in FIG. 10. In this embodiment, a shaft body 70b is integrally formed with the base of a control arm 70 and is rotatably supported to the sidewall of upper half housing 1. A pivotal support bore 70a for connecting with control rod 70, as in the above-mentioned embodiments, is open at the upmost end of control arm 70. On the outer peripheral surface of the inner end of shaft body 70b are formed spline grooves 70c by which a swinging arm 39 is retained. A plurality of movable side friction plates 71, or first friction members, are spline-fitted onto spline grooves 70c. Between adjacent friction plates 71 is interposed friction plate 72, or second friction member, which is axially slidably and non-rotatably retained to an inner end of a bolt 73 screwably supported in an upper portion of the sidewall of upper half housing 1. A bolt 74 perforates through shaft body 70b along the axis thereof. The head 74a of bolt 74 is disposed in the housing. A coil spring 76, or biasing member, is fitted between head 74a and a holding plate 75 disposed along the inner end surface of swinging arm 39. Bolt 74 projects at the other end thereof outwardly from control arm 70. A nut 77 is screwed onto the other end of bolt 74 outside the housing. Spring 76 biases friction plates 71 and 72 into press-contact with each other through holding plate 75 and swinging arm 39, thereby forming a holding means for arm 70 which is provided inside of the housing. The remainder of this embodiment is the same as that described above with respect to the previous embodiment.

In the above-described constructions, when control arm 38, 50, 60 or 70 is rotated, swinging arm 39 rotates longitudinally to enable movable swash plate 11 to be slantingly operated, thereby changing the output of hydraulic pump P. At the same time, friction plate 45, 52, 62 or 72, of the holding means, comes into press-contact with control arm 38, 50, 60 or 70, whereby movable swash plate 11 is prevented from returning to a neutral position. This results in control arm 38, 50, 60 or 70 being held in an optional speed change position after it has been rotated.

Although the invention has been described with reference to several embodiments, these embodiments are merely exemplary and are not limiting of the invention which is defined solely by the appended claims.

What is claimed is:

1. An axle driving apparatus comprising:
   a housing forming a fluid sump;
   an axle disposed in said housing;
   a hydrostatic transmission provided in said housing, said hydrostatic transmission including an input means for receiving power from a prime mover, an output means for driving said axle, and a speed adjusting means for optionally selecting the rotation direction and speed of said output means;
   a control means for operating said speed adjusting means, said control means disposed on said housing; and a holding means for restraining movement of said control means, said holding means including a fixed friction member disposed on said housing and a movable friction member disposed on said control means.

2. An axle driving apparatus according to claim 1, wherein said holding means uses friction to restrain movement of said control means.

3. An axle driving apparatus according to claim 2, wherein said holding means is disposed outside of said housing.

4. An axle driving apparatus according to claim 2, wherein said holding means is disposed inside of said housing.

5. An axle driving apparatus comprising:
   a housing forming a fluid sump;
   an axle disposed in said housing;
   a hydrostatic transmission provided in said housing, said hydrostatic transmission including an input means for receiving power from a prime mover, an output means for driving said axle, a speed adjusting means for optionally selecting the rotation direction and speed of said output means;
   a control means for operating said speed adjusting means, said control means including a control arm and a control shaft disposed on said housing; and
   a holding means for holding said control means in an optional position, said holding means including a first movable friction member disposed on one of said control arm and said control shaft of said control means, a second fixed friction member disposed on said housing and a biasing member for mutually biasing said first and second friction members toward one another.

6. An axle driving apparatus according to claim 5, wherein said holding means is disposed outside of said housing.

7. An axle driving apparatus according to claim 5, wherein said holding means is disposed inside of said housing.

8. An axle driving apparatus according to claim 5, wherein said biasing member comprises a spring.

9. An axle driving apparatus according to claim 5, further comprising:
   a force adjusting means for adjusting the biasing force of said biasing member with respect to said first and second friction members.

10. An axle driving apparatus comprising:
    a housing forming a fluid sump;
    an axle disposed in said housing;
    a hydrostatic transmission disposed in said housing, said hydrostatic transmission including input means for receiving power from a prime mover, output means for driving said axle, and speed adjusting means for optionally selecting the rotation direction and speed of said output means;
    a control means for operating said speed adjusting means, said control means disposed on said housing; and
    a holding means for holding said control means in an optional position, said holding means provided with a first friction member disposed on said control means, a second friction member fixed to said housing, and a biasing member for mutually biasing said first and second friction members toward one another.

11. An axle driving apparatus according to claim 10, wherein said holding means is disposed outside of said housing.

12. An axle driving apparatus according to claim 10, wherein said holding means is disposed inside of said housing.

13. An axle driving apparatus according to claim 10, wherein said biasing member comprises a spring.

14. An axle driving apparatus according to claim 10, further comprising:
    a force adjusting means for adjusting the biasing force of said biasing member with respect to said first and second friction members.

15. An axle driving apparatus comprising:
    a housing;
    an axle disposed in said housing;
    a hydrostatic transmission provided in said housing including input means for receiving power from a prime mover, output means for driving said axle, and control means for optionally selecting the rotation direction and speed of said output means and having an arm portion rotatable by being subjected to an operating force;
    holding means for holding said arm portion of said control means in an optional position, including,
    a circular-arc shaped bore provided in said arm portion and coinciding, at the center of said circular-arc shaped bore, with a rotational axis of said arm portion,
    a shaft member projecting from said housing into said circular-arc shaped bore, a fixed side friction plate movably disposed along the length of said shaft member,
    a spring member disposed on said shaft member for pressing said fixed side friction member onto said arm portion, and
    a retaining member provided on said shaft member for receiving a base of said spring member.

16. An axle driving apparatus according to claim 15, wherein said retaining member is screwed onto said shaft portion and being movable to an optional position along the length thereof.

17. An axle driving apparatus according to claim 15, wherein said fixed side friction plate is disposed outside said housing and one end of said shaft member is disposed within said housing and the other end is disposed outside said housing.

18. An axle driving apparatus comprising:
    a housing;
    an axle disposed in said housing;
    a hydrostatic transmission provided in said housing including input means for receiving power from a prime mover, output means for driving said axle, and control means for optionally selecting the rotation direction and speed of said output means; and
    holding means for holding said control means in an optional position;
    wherein said speed adjusting means includes a speed control arm rotatably supported on said housing, and said holding means is provided with a first friction member which is not rotatable with respect to said speed control arm and, is axially slidable along said speed control arm, a second friction member superposed on said first friction member on said speed control arm and fixed to said housing so as to not be rotatable with respect to said housing and movable longitudinally on said speed control arm, and a biasing member for mutually biasing said first and second friction members toward one another.

19. An axle driving apparatus according to claim 18, further comprising:

a cover member mounted onto an outer wall of said housing so as to fix said second friction member in a non-rotatable manner with respect to said housing and movable longitudinally of said speed control arm.

20. An axle driving apparatus according to claim 18, wherein said first friction member is disposed on a portion of said speed control arm disposed in said housing and said second friction member is fixed within said housing.

21. An axle driving apparatus according to claim 20, wherein said portion of said control arm is a shaft body.

* * * * *